Aug. 9, 1966
H. E. BACH ETAL
3,265,268
WIRE FEEDING DEVICE
Filed May 6, 1964
3 Sheets-Sheet 1
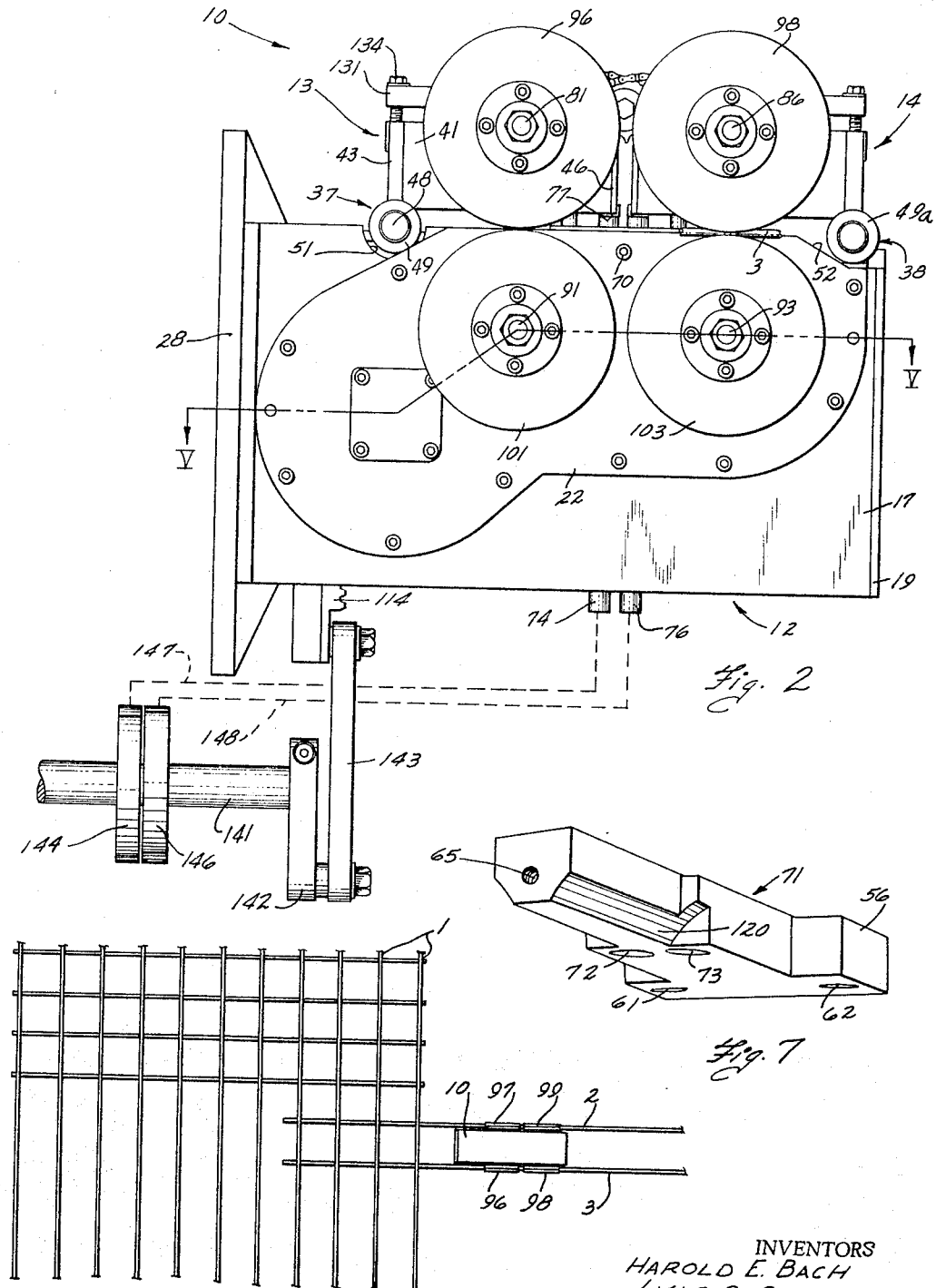
INVENTORS
HAROLD E. BACH
LYLE G. GILBERT
BY
Woodhams, Blanchard & Flynn
ATTORNEYS Aug. 9, 1966  H. E. BACH ETAL  3,265,268
WIRE FEEDING DEVICE Filed May 6, 1964  3 Sheets-Sheet 2

INVENTORS
HAROLD E. BACH
LYLE G. GILBERT
BY
Woodhams, Blanchard & Flynn
ATTORNEYS Aug. 9, 1966    H. E. BACH ETAL    3,265,268
WIRE FEEDING DEVICE
Filed May 6, 1964    3 Sheets-Sheet 3

INVENTORS
HAROLD E. BACH
LYLE G. GILBERT
BY
Woodhams, Blanchard & Flynn
ATTORNEYS United States Patent Office 3,265,268
Patented August 9, 1966

3,265,268
WIRE FEEDING DEVICE
Harold E. Bach, Monitor Township, Bay County, and Lyle G. Gilbert, Bay City, Mich., assignors to National Electric Welding Machines Co., Bay City, Mich., a corporation of Michigan
Filed May 6, 1964, Ser. No. 365,397
9 Claims. (Cl. 226—112)

This invention relates to a device for longitudinally advancing an elongated element and, more specifically, relates to a device for simultaneously feeding a parallel pair of wires in a longitudinal direction.

The device of the invention was developed for use with a machine for welding reinforcing mats used in concrete highways. Hence, for convenience, the following discussion will refer to the invention in terms of such use but only for purposes of illustration. It will be understood that the invention is in no way limited to such usage but rather is adaptable to a wide variety of uses involving translation of elongated elements.

Machines for assembling and welding reinforcing mats of the type above-mentioned are relatively large machines designed to operate at a high rate of speed. In general, longitudinal wires are fed in one direction and cross wires are fed perpendicularly thereto. When the wires are correctly positioned, they are welded at their points of intersection to produce the desired mat. One part of the particular machine with which the device hereindescribed was developed was discussed in a copending application entitled "Adjusting Device for Welding Head," Serial No. 365,373 filed May 6, 1964 and, further, this general type of machine is well known to the art. In this particular machine the longitudinal wires are fed continuously and the cross wires are fed intermittently, usually from rolls thereof although precut cross wires may be used.

Most earlier machines for welding reinforcing mats of the type described have often used precut cross wires which have required machines for straightening and cutting cross wires, magazines for holding such wires, often machines for conveying the precut wires into such magazines, together with the labor for supervising all of this additional equipment. Other machines which have attempted to cut and feed cross wires as same are utilized have had the inherent difficulty that the longitudinal wires can be run much faster than the cross wires can be fed, stopped, cut off and fed again. Incorporation of the feeding device embodying the invention alleviates this difficulty by simultaneously feeding a pair of cross wires. Thus, at the given speed of cross wire feed, the longitudinals can be run almost twice as fast as previously. In the particular machine with which the device of the invention was developed, the welding units keep up with this increased speed with no difficulty.

Thus, the objects of this invention include:

(1) To provide the feeding device for axially advancing elongated elements.

(2) To provide a feeding device, as aforesaid, for simultaneously and intermittently feeding in an axial direction a spaced pair of wires at a precisely controllable rate.

(3) To provide a feeding device, as aforesaid, particularly adaptable for feeding cross wires on a wire reinforcing mat welding machine, said cross wires being supplied from a continuous roll or being precut, said feeding device being particularly well adapted for intermittently supplying continuous runs of wire to cutting means on said welding machine by being capable of periodic pauses during which wires driven thereby are stopped.

(4) To provide a feeding device, as aforesaid, including alternately operating sets of rollers for alternately engaging each wire, said rollers being rotated in a direction for advancing said wire when engaging same.

(5) To provide a feeding device, as aforesaid, including a directional drive means driving said rollers alternately in opposite directions and means disengaging said rollers from said wires when the direction of rotation thereof is not such as to advance the wires in the direction desired.

(6) To provide a feeding device, as aforesaid, driven by reciprocating means to facilitate equal and precisely controllable motion of said roller sets.

(7) To provide a feeding device, as aforesaid, constructed of relatively few parts, having either easily made or readily available parts and which is readily adapted to either custom or mass production at relatively low cost.

(8) To provide a feeding device, as aforesaid, which is easily adapted to existing machines, which is easily installed or removed therefrom, which is easily maintained in satisfactory operating condition, which will have a long and relatively trouble-free service life and which will be capable of adapting to a wide variety of wire or extended element types and other operational conditions and requirements.

Other objects and purposes of this invention will be apparent to persons acquainted with apparatus of this general type upon reading the following specification and inspecting the accompanying drawings.

In the drawings:

FIGURE 1 is a schematic plan view of a wire mat in the process of assembly and showing schematically the feeding device embodying the invention.

FIGURE 2 is a side elevational view of the feeding device embodying the invention.

FIGURE 7 is a perspective view of a part of the feeding device of FIGURE 1.

Figure 3:
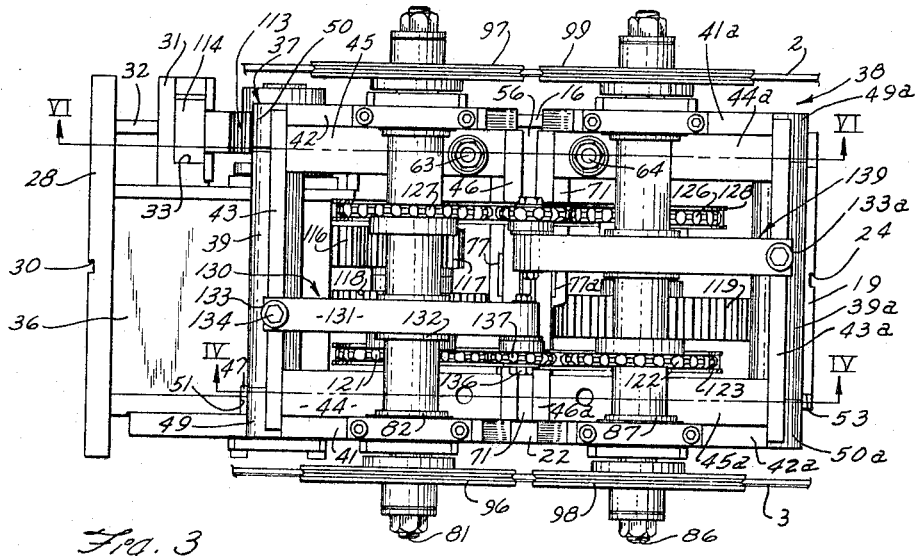
FIGURE 3 is a top view of the feeding device embodying the invention.
Figure 4:
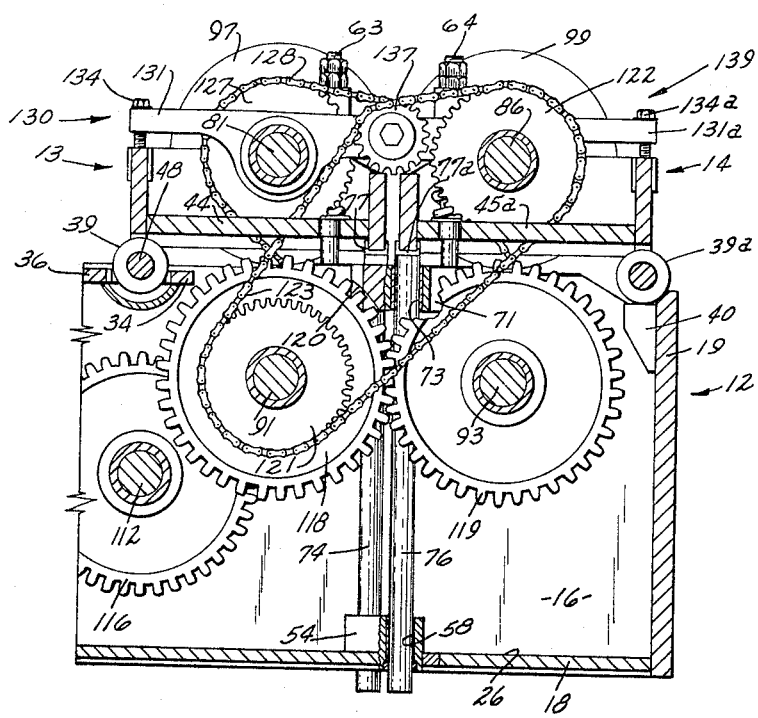
FIGURE 4 is a partially broken, cross-sectional view essentially as taken on the line IV—IV of FIGURE 3.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to the direction of material flow through the device, "forwardly" being the normal flow direction and being leftwardly in FIGURES 1 through 6. The words "inwardly" and "outwardly" will refer to directions toward and away from, respectively, the geometric center of the device and designated parts thereof. Said terminology will include the words above specifically mentioned, derivatives thereof and words of similar import.

*General description*

In general, the objects and purposes of this invention are met by providing a feeding device including a box-like support structure which rotatably supports four feeding rollers on each of a pair of opposed sides thereof by means of shafts having one such roller fixed upon each end thereof. The support structure includes a fixed lower frame locating one bottom pair of rollers on each side thereof and a pair of upper frames movably mounted on said lower frame and each carrying one roller on each side thereof. The feeding device is capable of advancing a wire along each of said pair of opposed sides thereof, said wire being located between the lower pair of wheels and the upper pair of wheels on that side. The shafts are rotatably energizable by means including a reciprocably driven drive element whereby one pair of co-operating upper and lower rollers is driven to advance the wire in the desired direction and simultaneously the adjacent pair of upper and lower rollers on the same side are driven in the opposite direction. Reversal of the reciprocating drive means reverses the direction of rotation of the rollers. Push rod means synchronized with said reciprocable drive element lift said upper frames alternately to alternately effect driving of said wire by said one pair of upper and lower rollers and simultaneously prevent driving of the wire by said adjacent pair of upper and lower rollers, the driving upper and lower wheel pair being those rotated in a direction for advancing the wire.

Detailed description

Turning now to the drawings, FIGURE 1 discloses a feeding device 10 embodying the invention located near a plurality of longitudinal wires 1. The feeding device 10 feeds cross wires 2 and 3 simultaneously and perpendicularly to the longitudinal wires 1 for defining a wire mat. This usage is for purposes of illustration only and constitutes no limitation on the invention.

Considering the feeding device 10 in more detail, same includes a support structure generally indicated at 11 (FIGURE 2). The support structure 11 includes an essentially box-like lower frame 12 upon which are movably supported two upper frames 13 and 14 in a manner hereinafter described.

Figure 5:
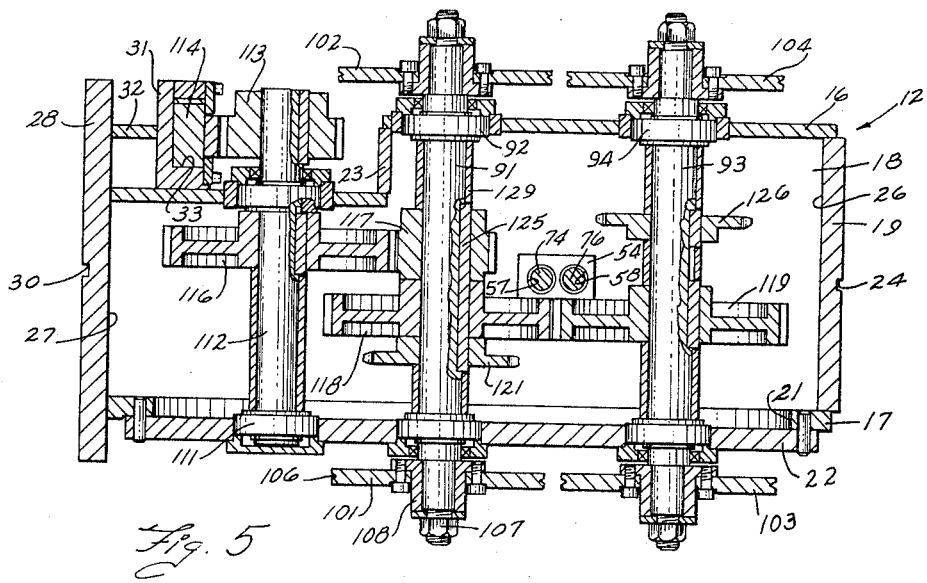
FIGURE 5 is a partially broken, sectional view essentially as taken on the line V—V of FIGURE 2.
Figure 6:
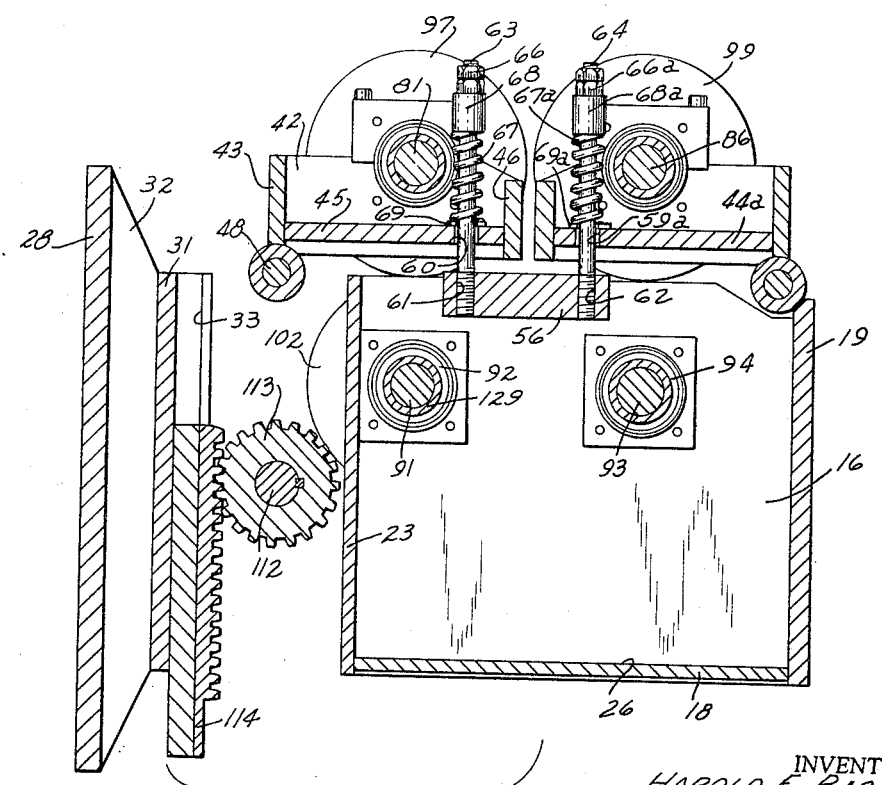
FIGURE 6 is a sectional view taken on the line VI—VI of FIGURE 3.

The lower frame 12 comprises a parallel, spaced pair of side walls 16 and 17 (FIGURE 5) joined along their bottom edges by a bottom wall 18 (FIGURE 6) and along their rearward ends (rightward as seen in FIGURES 2, 5 and 6) by a generally upstanding rear wall 19. The rear wall 19 has an upstanding keyway 24 therein for mounting, or at least aligning therewith, any convenient wire supply means, not shown. The side wall 17 is here provided with an access opening 21 therethrough covered by a removable cover plate 22. The forward portion of the side wall 16 is jogged inwardly at 23. Thus, there is formed within the lower frame 12 a rearwardly placed and relatively wide roller shaft chamber 26 and a forwardly placed and relatively narrow pinion shaft chamber 27 communicating therewith. A mounting plate 28 joins the forward ends of the side walls 16 and 17 and the bottom wall 18 to close the forward end of the pinion shaft chamber 27. The mounting plate has a keyway 30 therein for positioning the feeding device 10 with respect to a machine to be fed thereby. An upstanding rack guideway 31 is affixed by any convenient means to the outer surface of the side wall 16 and by means of an extension 32 to the rear face of the mounting plate 28. The rack guideway 31 has a rearwardly opening generally T-shaped keyway 33 therein. The lower frame 12 further includes a top wall 36 (FIGURES 3 and 4) covering the forward part of the pinion shaft chamber 27 and a coplanar bar 34 spaced rearwardly from said top wall 36.

The upper frames 13 and 14 are pivotally mounted at their outer ends on the lower frame 12 by means of preferably identical hinges 37 and 38 (FIGURES 2, 3 and 4), respectively, the pivot axes of which are parallel and preferably lie in the plane defined by the top edges of the side walls 16 and 17 of the lower frame 12. The hinge 37 includes a cylindrical midportion 39 fixed, by any convenient means such as welding, between the top plate 36 and bar 34. The midportion 39a of the hinge 38 is similarly affixed to the end wall 19 by means including a support block 40.

The upper frames 13 and 14 are preferably identical and, therefore, only the upper frame 13 will be described. Parts of the upper frame 14 will carry the reference numerals of corresponding parts of the upper frame 13 with the suffix "a" added. Said parts will include parts of the hinges 37 and 38 mounted on the upper frames 13 and 14, respectively. The upper frame 13 comprises a pair of parallel, spaced side walls 41 and 42 connected by an outer end wall 43 and an inner end wall 46. A pair of relatively narrow, widely spaced strips 44 and 45 each contacts one of the side walls 41 and 42 near the lower edge thereof and runs between the end walls 43 and 46.

The hinge 37 includes a spaced pair of cylindrical end elements 49 and 50 fixed by any convenient means such as welding to the lower edge of the outer end wall 43 and which surround and are coaxial with the midportion 39 when the upper frame 13 is correctly installed on the lower frame 12. A hinge pin 48 pivotally connects the midportion 39 and end elements 49 and 50 to complete the hinge 37.

Each of the side walls 16 and 17 of the lower frame 12 has an upwardly facing semicircular notch 51 in its upper edge, and the top wall 36 and bar 37 are relieved at the side wall 17 as shown at 47 adjacent the hinge 37 for providing clearance for the end element 49 thereof. The rear ends of the side walls 16 and 17 each has a ramp 52 in the upper edge thereof extending to a depth equal to that of the notch 51 and the rear wall 19 is relieved as indicated at 53 (FIGURE 3) for clearing the end elements 49 of the hinge 38.

A push rod guide 54 (FIGURES 4 and 5) is fixed on the bottom wall 18 of the lower frame 12 and in the center of the roller shaft chamber 26. The guide 54 includes a longitudinally aligned pair of spaced vertical openings 57 and 58.

A generally T-shaped bridge 71 (FIGURES 3, 4, 6 and 7) joins the side wall 16 to the cover plate 22 on the side wall 17 at the upper edges thereof and is located directly above the push-rod guide 54. The narrow end of the bridge 71 is fixed by means of the screw 70 (FIGURE 2) engaging a threaded opening 65 (FIGURE 7) therein to said cover plate 22. The crosshead of said T-shaped bridge 71 comprises an anchor block 56 (FIGURE 6) fixed by any convenient means (not shown) to the side wall 16. The lower ends of upstanding posts 63 and 64 engage threaded openings 61 and 62, respectively, in the anchor block 56. Said posts 63 and 64 extend upwardly through wide clearance openings 60 and 59a in the adjacent strips 45 and 44a, respectively, of the upper frames 13 and 14. The posts 63 and 64 carry nuts 66 and 66a, respectively, adjustably threaded on the upper ends thereof. Spiral compression springs 67 and 67a coaxially surround said posts 63 and 64, respectively. The spring 67 is retained between the nuts 66 and strip 45 by keeper washers 68 and 69. Similarly, the spring 67a is retained between the nuts 66a and strip 44a by keeper washers 68a and 69a. Thus, the springs 67 resiliently urge the upper frames 13 and 14 downwardly toward the lower frame 12 with a force determined by the adjustment of the nuts 66.

The bridge 71 (FIGURES 4, 5 and 7) includes a pair of openings 72 and 73 which are coaxial with the openings 57 and 58, respectively, of the push-rod guide 54. The openings 57, 72 and 58, 73 slidably enclose and guide a parallel, spaced pair of vertical push rods 74 and 76, respectively. The push rods 74 and 76 (FIGURES 3 and 4) normally extend downwardly below the bottom wall 18 of the lower frame 12 for vertical reciprocating actuation by any convenient actuating means such as that hereinafter described. The upper ends of the push rods 74 and 76 normally extend upwardly into contact with thrust pads 77 and 77a, respectively, fixed to the lower edge of the inner end walls 46 and 46a of the respective upper frames 13 and 14. Thus, the inner ends of the upper frames 13 and 14 are capable of upward energization by corresponding upward movement of the respective push rods 74 and 76.

A shaft 81 (FIGURES 2 and 3) is rotatably supported forward of the post 63 by suitable bearings 82 in the side walls 41 and 42 of the forward upper frame 13. The rearward upper frame 14, similarly, rotatably supports a shaft 86 on bearings 87 so that said shafts 81 and 86 are parallel to each other and are equally spaced from the outer end walls of the upper frames 13 and 14. The lower frame 12 rotatably supports a further pair of shafts 91 and 93 on respective bearing sets 92 and 94 (FIGURE 5) mounted in the side walls 16 and cover plate 22. The shafts 91 and 93 are parallel to the shafts 81 and 86, lie respectively directly therebelow and are spaced equal distances therefrom. The ends of the shafts 81, 86, 91 and 93 (FIGURES 2, 3 and 5) support preferably identical, respective rollers 96 and 97, 98 and 99, 101 and 102, and 103 and 104 outwardly spaced from the support structure 10. Said rollers are here disk-shaped and have a circumferential, generally V-shaped groove 106 therein. The rollers on each side of the support structure 11 define a common plane, said planes being parallel to each other. The shafts 91 and 93 as well as the shafts 81 and 86 are spaced to prevent interference between the rollers thereon. The rollers may be held on their respective shafts 81, 86, 91 and 93 by any convenient means which here include the nuts 107 and arbors 108. The rollers supported upon the upper frames 13 and 14 are, with the push rods 74 and 76 in their downwardmost position, sufficiently close to the rollers of the lower frame 12 as to grip for driving engagement therebetween an elongated element such as the wires 2 and 3. In the particular embodiment shown, the wire 3 lies at the level of the top of the lower frame 12. Thus, the bottom of the upper rollers when in contact with the wire are at least approximately at the level of axis of the hinges 37 and 38, whereby the initial component of motion of said upper rollers is vertical during upward pivoting of said upper frames on said hinges and the rollers do not tend to move the wires as said rollers are lifted off said wires.

The lower frame 12 also rotatably supports in bearings 111 a pinion shaft 112 which spans the pinion chamber 27 and is parallel to and spaced from the shaft 91. The shaft 112 extends outwardly of the pinion chamber 27 adjacent the rack guideway 31 to carry a pinion gear 113 fixed thereto. The pinion gear 113 is engaged by a toothed rack 114 which is supported for bidirectional motion therepast by the rack guideway 31 (FIGURE 5). A large gear 116 fixed to the pinion shaft 112 between the bearings 111 engages a preferably smaller gear 117 fixed to the lower roller shaft 91. Preferably identical transfer gears 118 and 119 are respectively fixed to the roller shafts 91 and 93 whereby said shafts rotate at equal speeds and in opposite rotational directions. The afore-mentioned bridge 71 is suitably relieved as at 120 (FIGURES 4 and 7) to avoid interference with drive means connecting the shafts 81, 86, 91 and 93 and in particular to avoid interference with the transfer gears 118 and 119. The shaft 91 also drivingly supports a drive sprocket 121 (FIGURES 3 and 4) which is radially aligned with a preferably identical drive sprocket 122 fixed to the rearward upper roller shaft 86 for driving same through a drive chain 123. A drive sprocket 126 is fixed to the other lower shaft 93 (FIGURES 3 and 5) and is radially aligned with preferably identical driven sprocket 127 on the forward upper roller shaft 81 by a drive chain 128. The afore-mentioned gears and sprockets are prevented from rotating on their shafts by any convenient means such as the keys 125 (FIGURE 5) and are axially located on said shafts by any convenient means such as the sleeves 129.

Preferably identical idler means 130 and 139 (FIGURES 3 and 4) maintain the chains 123 and 128 on their respective sprockets and prevent interference between said chains and the bridge 71. Since said idler means are identical, only the means 130 will be described and parts of the means 139 will be designated by the same reference numerals as the corresponding parts of the means 130 with the suffix "a" added thereto. The idler means 130 includes a rocker arm 131 which is pivotally affixed intermediate the ends thereof to the forward upper roller shaft 81 by bushing means 132. The outer end (rightward or forward) of the rocker arm 131 has a generally U-shaped axially opening slot 133 therein. A screw 134 passes downwardly through the slot 133 and threadedly engages the upper edge of the outer wall 43 of the forward upper frame 13. Thus, pivotal motion of the rocker arm 131 about the axis of the shaft 81 has limits defined by movement of the outer end of said rocker arm 131 between the head of the screw 134 and the top of the outer end wall 43 of the upper frame 13. The inner (rightward or rearward) end of the rocker arm 131 pivotally mounts on a stub shaft 136 an idler sprocket 137. The idler sprocket 137 is preferably radially aligned with the sprockets 121 and 122 and contacts the inner surface of the chain 123.

The rack 114 and push rods 74 and 76 may be driven by any convenient means. For example, a constantly rotating drive shaft 141 (FIGURE 2) which may be part of a machine with which the device of the invention is to be used, carries a crank 142 for rotation therewith. The crank 142 connects through a pitman arm 143 to the rack 114. If desired, the crank 142 and pitman arm 143 may be adjustable in length to vary the length of the stroke of the rack 114. The drive shaft 141 also carries for rotation therewith a pair of preferably identical, oppositely phased cams 144 and 146 which, by means of any convenient mechanical connection indicated by the broken lines 147 and 148, cause upward motion of the push rods 74 and 76, respectively. The cams 144 and 146 are preferably arranged so that when the rack 114 is moving upwardly between its limiting positions, the push rods 76 will be raised and when the rack 114 is moving downwardly between its limiting positions the push rod 74 will be raised. Both push rods 74 and 76 may be down when the rack 114 is in either of its limiting positions.

*Operation*

Although the operation of the feeding device 10 embodying the invention has been indicated somewhat above, said operation will be described in detail hereinbelow to insure a more complete understanding of the invention.

Assuming elongated elements such as the wires 2 and 3 (FIGURES 2 and 3) to be aligned between the upper and lower rollers of the feeding device 10, energization of said feeding device 10 by means such as the drive shaft 141 will cause said wires to be moved forwardly (to the left in FIGURE 3). With the rack 114 moving upwardly, means synchronized therewith and here exemplified by the cam 146 raise the push rod 76 and hence the inner end of the upper frame 14. The upper frame 14 is constantly urged downwardly in opposition to the upward motion of the push rod 76 by the spring 67a on the post 64. The initial upward motion of the push rod 76 pivots the upper frame 14 about the axis of the hinge 38 to lift the rollers 98 and 99 free of the wires 3 and 2, respectively. Since the push rod 74 has not been raised, the rollers 96 and 97 remain in contact with the wires 3 and 2 respectively. The idler means 130 and 139 are set so that the chains 123 and 128 are not pulled tight when the push rods 74 and 76 are down but yet still efficiently drive the sprockets 122 and 127. The path of upward motion of the upper frames 13 and 14 is sufficiently short that the chains 123 and 128 are not overly tightened by such upward movement.

Upward movement of the rack 114 causes a corresponding clockwise (as seen in FIGURE 6) rotation of the pinion shaft 112 which through the gears 116 and 117 causes a counterclockwise rotation of the lower shaft 91. This counterclockwise rotation is impressed on the upper rearward roller shaft 86 by means of the sprockets 121 and 122 and chain 123. Counterclockwise rotation of the shaft 91 also causes a clockwise or reversed rotation of the shaft 93 through the transfer gears 118 and 119. This clockwise rotation of the shaft 93 is passed by the sprockets 126 and 127 and chain 128 to the upper forward roller shaft 81. Thus, adjacent ones of the roller shafts 81, 86, 91 and 93 rotate in opposite directions. Thus, the roller pairs 96, 101 and 97, 102 which grip the respective wires 3 and 2 are rotated to translate said wires forwardly by the upward motion of the rack 114. Simultaneously, the roller pairs 98, 103 and 99, 104 rotate oppositely but do not grip said wires therebetween and so cannot impress rearward movement thereon. When the rack 114 reaches the upper point in its path, downward motion therof begins and the rotational direction of the pinion and roller shafts is reversed so that the roller shafts 86 and 94 are turning in the direction for advancing the wires 2 and 3. Thus, the push rod 76 is lowered to allow engagement of the wires 2 and 3 by rollers of the shaft 86 and the push rod 74 is elevated to disengage the rollers of the shaft 91 from said wires. Motion of the rack 114 is reversed when it reaches its lowermost point so that said rack travels upwardly again and the push rod 76 is again raised and the push rod 74 lowered for starting a new cycle.

The motion of the rack 114 requires a velocity direction reversal at each end of its stroke and therefore requires said rack to be stationary at each end of the stroke. Hence, the rollers engaging the wires 2 and 3, and therefore said wires, are stopped. When the wires 2 and 3 are fed from continuous rolls, stopping thereof allows the wire to be cut off by a stationary cutting machine of any convenient type. Further, the stoppage of the rollers allows at least one set of rollers to grip each wire at all times and, if desired, both roller sets may grip each wire when said rollers are stopped. Thus, each of the wires is positively gripped at all times including those times when it is stationary and/or being cut. This avoids dropping of the wire by the rollers and provides a positive wire feed wherein wire overshoot is avoided. The direction reversal of the rack allows the length of wire advanced per half cycle thereof to be easily and precisely determinable and to be repeatable within very close tolerances from reciprocation to reciprocation.

While there are many ways to drive the rack 114 and push rods 74 and 76, the particular example shown in FIGURE 2 and discussed hereinabove is advantageous in several ways. The drive shaft 141 drives the rack 114 with a simple harmonic reciprocating motion which imposes relatively low acceleration rates on said rack and thus on the wire-supporting rollers whereby slippage of the rollers on the wire is minimized and the positiveness of the wire drive is thereby maximized. Further, the speed of the rack adjacent its limiting positions is very small whereby to give extra time to a stationay cutting device operating on the wire.

While the particular embodiment of the invention disclosed has included means for advancing a pair of wires simultaneously, it will be understood that said device will advance only one wire if desired. It will also be understood that advancement of more than two wires as by provision of more rollers on each shaft or by provision of more grooves in each roller is fully contemplated. Means other than that shown for driving the push rods 74 and 76 and the rack 114 are contemplated and the invention is not limited to the means shown.

Although a particular preferred embodiment of the invention has been disclosed above for illustrative purposes, it will be understood that variations or modifications thereof which lie within the scope of the appended claims, are fully contemplated.

What is claimed is:

1. In a feeding device for advancing an elongated element, the combination comprising:
   first and second pairs of rollers engageable with said elongated element;
   first means for effecting engagement of said elongated element by said first pair of rollers and second means for effecting engagement of said elongated element by said second pair of rollers, said first and second means being operable independently and alternately of each other;
   roller energizing means for rotating said first pair of rollers in a direction for advancing said elongated element in one direction and for rotating said second pair of rollers in a direction for moving said elongated element in a direction opposite to said one direction, said roller energizing means being reversible to effect reverse rotation of said rollers;
   means effecting synchronized alternate operation of said first and second means with alternately reversing operation of said roller energizing means;
   whereby to produce motion of said elongated element in only said one direction.

2. In a feeding device for advancing a wire longitudinally in a desired direction, the combination comprising:
   coplanar first and second pairs of circumferentially grooved rollers each pair engageable with said wire, said roller pairs being spaced along said wire;
   first frame means articulated for engaging and disengaging said first pair of rollers with said wire and second frame means similar to said first frame means for engaging and disengaging said second pair of rollers with said wire, said first and second frame means being operable independently of each other;
   roller energizing means for rotating said first pair of rollers to advance said wire in one direction and for rotating said second pair of rollers to move the wire in the opposite direction, said roller energizing means being reversible to reverse the rotation of said rollers;
   frame energizing means synchronizable with said roller energizing means and capable of operating said first and second frame means to produce movement of said wire in said one direction only by inducing alternate engagement of said wire by said first and second pairs of rollers.

3. The feeding device defined in claim 2 wherein said roller energizing means includes a reciprocable rack and a rain of toothed elements positively engaging said rack and said first and second pairs of rollers for driving said rollers;
   said rack having preselected limits to the reciprocation thereof whereby to positively limit the angular motion of said rollers and thereby limit the length of travel of said wire during a single translation of said rack between said limits.

4. The feeding device defined in claim 2 wherein said first and second frame means each comprises an upper frame mounted upon portions of a common lower frame, said upper frames being resiliently urged toward said lower frame and being pivotally mounted thereon, one of said upper frames carrying a roller of said first pair of rollers and the other of said upper frames carrying a roller of said second pair of rollers and said lower frame carrying the remaining rollers of said first and second pair of rollers, said wire continuously contacting the rollers on said lower frame;
   said frame energizing means including elements for urging said upper frames independently away from said lower frame to disengage the rollers carried thereby from said wire, said frame energizing means allowing one of said first and second pairs of rollers to engage said wire while the roller of the remaining pair which is carried by an upper frame is disengaged from said wire whereby the direction of advancement of said wire will be determined by the direction of rotation of the rollers of said one pair.

5. In a feeding device for simultaneously, unidirectionally advancing a spaced pair of wires, the combination comprising:
   a fixed lower frame;
   a parallel pair of lower shafts horizontally aligned on and rotatably supported by said lower frame;
   a pair of upper frames and means movably mounting same with respect to said lower frame;
   an upper shaft rotatably supported on each of the upper frames, said upper shafts being parallel with and normally equally spaced from corresponding ones of said lower shafts and each of said upper shafts being located directly over said corresponding ones of said lower shafts;

a roller mounted for rotation on and with each end of each shaft outward of said frames for defining a pair of parallel planes perpendicular to said shafts, one of said wires normally lying on the lower rollers on one side of said device and the other said wires normally lying on the lower rollers on the other side of said device, said rollers on said upper frames being movable into contact with the wire supported upon the corresponding lower roller for gripping said wires between ones of said upper and lower rollers;

reciprocating means and a drive train driven thereby for imparting an alternately reversing angular motion to said rollers, said drive train causing each of said rollers to rotate in a direction opposite to that of the adjacent horizontally and vertically aligned rollers whereby one vertically aligned roller pair moves to advance the wire adjacent thereto in one direction when the coplanar vertically aligned roller pair moves to retract said wire;

a pair of push rods each engaging one of said upper frames for moving same alternately upwardly for disengaging the rollers carried thereby from the wires; and drive means synchronizing the motion of said push rods and said reciprocating means whereby said wires are advanced by said device in only one direction.

6. The device defined in claim 5 wherein said means mounting said upper frames includes resilient means urging said upper frames toward said lower frame and mounted intermediate the ends of said upper frames, and a hinge fixed on the outer end of each of said upper frames and fixed to said lower frame, said push rods bearing upwardly on the inner ends of said upper frames;

whereby upward motion of a push rod moves the inner end of the associated upper frame upwardly for pivoting said upper frame on said hinge so that the rollers of said upper frame leave said wire.

7. The device defined in claim 5 wherein said reciprocating means comprises a toothed rack mounted for reciprocation and said drive train includes speed changing gears between said rack and one of the lower shafts, a geared connection between the lower shafts for maintaining rotation thereof in opposite directions at the same speed, and identical sprockets drivingly connected by chains on diagonally opposite shafts.

8. The device defined in claim 5 including:

sprockets on diagonally opposite shafts drivingly connected by chains; and idler means for each chain comprising a rocker arm pivotally mounted on one of said upper shafts, limit means on the outer end of each upper frame for allowing limited pivotal movement of said rocker arm and an idler sprocket on the inner end of said arm, said chain engaging said idler sprocket and sprockets on the other of said upper shafts and the lower shaft located below said one shaft on which the rocker arm is pivotally mounted.

9. The device defined in claim 5 wherein:

said reciprocating means is a toothed rack drivingly engaging said upper and lower shafts through positive motion transfer means; and said drive means comprising a continuously rotating drive shaft driving said rack through a crank and pitman arm in simple harmonic motion and said rotating shaft carries a pair of cams, each of said cams driving one of said push rods for raising same whereby at least one push rod is lowered when the rack is at the limits of its travel and alternate push rods are raised while the rack is between the limits of the travel in alternate directions.

References Cited by the Examiner

UNITED STATES PATENTS 425,382  8/1947  Lubbert _____ 226—112

M. HENSON WOOD, JR., *Primary Examiner.*

J. ERLICH, *Assistant Examiner.*